United States Patent
Jing et al.

[11] Patent Number: 6,115,951
[45] Date of Patent: Sep. 12, 2000

[54] PORTABLE AND COMPACT RETROREFLECTIVE SIGN SYSTEM

[75] Inventors: James X Jing, Avon, Conn.; Tsunenori Matsunaga; Takashi Kawai, both of Tokyo, Japan

[73] Assignee: Reflexite Corporation, Avon, Conn.

[21] Appl. No.: 09/129,295

[22] Filed: Aug. 5, 1998

Related U.S. Application Data

[60] Provisional application No. 60/055,014, Aug. 6, 1997, provisional application No. 60/054,960, Aug. 7, 1997, and provisional application No. 60/075,208, Feb. 19, 1998.

[51] Int. Cl.[7] .................. G09F 15/00; E01F 9/00
[52] U.S. Cl. .................. 40/610; 40/610; 40/612; 116/63 P; 160/24
[58] Field of Search .................. 40/606, 610, 612; 116/63 P; 160/24, 23.1; 248/188.5, 295.11

[56] References Cited

U.S. PATENT DOCUMENTS

| | | | |
|---|---|---|---|
| 3,329,195 | 7/1967 | Kochanowski | 160/23.1 |
| 3,616,557 | 11/1971 | Vara | 40/138 |
| 3,684,348 | 8/1972 | Rowland | 350/103 |
| 3,689,346 | 9/1972 | Rowland | 156/245 |
| 3,712,706 | 1/1973 | Stamm | 350/103 |
| 3,792,678 | 2/1974 | Rowland | 116/63 P |
| 3,899,843 | 8/1975 | Doyle et al. | 40/125 G |
| 4,817,318 | 4/1989 | Strauch | 40/610 |
| 4,980,984 | 1/1991 | Kulp et al. | 40/610 |
| 5,031,347 | 7/1991 | Berg | 40/591 |
| 5,152,091 | 10/1992 | Leach | 40/603 |
| 5,175,646 | 12/1992 | Eden | 359/536 |
| 5,176,774 | 1/1993 | Laniado et al. | 156/162 |
| 5,318,258 | 6/1994 | Lang | 248/166 |
| 5,446,984 | 9/1995 | Kulp et al. | 40/610 |
| 5,451,287 | 9/1995 | Marty | 156/446 |
| 5,540,007 | 7/1996 | Kulp et al. | 40/610 |
| 5,551,177 | 9/1996 | Cowgill et al. | 40/610 |
| 5,551,178 | 9/1996 | Foley et al. | 40/610 |
| 5,729,926 | 3/1998 | Cowgill et al. | 40/610 |
| 5,732,911 | 3/1998 | Kulp et al. | 248/158 |
| 5,875,597 | 3/1999 | Gingrich et al. | 160/24 X |

FOREIGN PATENT DOCUMENTS

| | | | |
|---|---|---|---|
| 1 526 855 | 10/1976 | United Kingdom | B60Q 7/00 |
| 2 054 234 | 2/1981 | United Kingdom | E01F 9/00 |
| WO97/37252 | 10/1997 | WIPO . | |

Primary Examiner—Terry Lee Melius
Assistant Examiner—James M Hewitt
Attorney, Agent, or Firm—Hamilton, Brook, Smith & Reynolds, P.C.

[57] ABSTRACT

A portable and compact retroreflective sign system includes a base, a winding mechanism roller attached to the base, and a retroreflective roll-up sheeting having a first end and a second end, wherein the first end is attached to the roller and the sign is wound about the roller. A sign support is attached to the base for supporting the roll-up sign in an unrolled position, wherein the sign support is extendible from the base. An attachment means is present at the second end of the retroreflective roll-up sheeting for attaching the sheeting to the sign support.

14 Claims, 4 Drawing Sheets

PORTABLE AND COMPACT RETROREFLECTIVE SIGN SYSTEM

RELATED APPLICATIONS

This present application claims priority to co-pending U.S. Provisional patent application Ser. No. 60/055,014, filed on Aug. 6, 1997; U.S. Provisional Patent Application Ser. No. 60/054,960, filed on Aug. 7, 1997; and U.S. Provisional Patent Application Ser. No. 60/075,208, filed on Feb. 19, 1998. The entire teachings of each application are incorporated herein by reference.

BACKGROUND OF THE INVENTION

Flexible, temporary road signs for advance warning to a motorist of an approaching unsafe driving area or construction site are known in the art. A flexible road sign, capable of being disassembled and rolled up for convenience and portability, is exemplified by the teachings in U.S. Pat. No. 4,980,984. However, such signs are inconvenient to store when not in use.

SUMMARY OF THE INVENTION

The invention includes a portable and compact retroreflective sign system. The system includes a base, a winding mechanism roller attached to the base, and a retroreflective roll-up sheeting having a first end and a second end, wherein the first end is attached to the roller and the sign is wound about the roller. A sign support is attached to the base for supporting the roll-up sign in an unrolled position, wherein the sign support is extendible from the base. An attachment means is present at the second end of the retroreflective roll-up sheeting for attaching the sheeting to the sign support.

The present invention has many advantages including being compact and portable storage system. Also, the storage system provides substantial stability to the sign system in windy conditions.

DETAILED DESCRIPTION OF THE INVENTION

The features and details of the method and apparatus of the invention will now be more particularly described with reference to the accompanying drawings and pointed out in the claims. It will be understood that the particular embodiments of the invention are shown by way of illustration and not as limitations of the invention. The principal features of this invention can be employed in various embodiments without departing from the scope of the invention.

Figure 1:
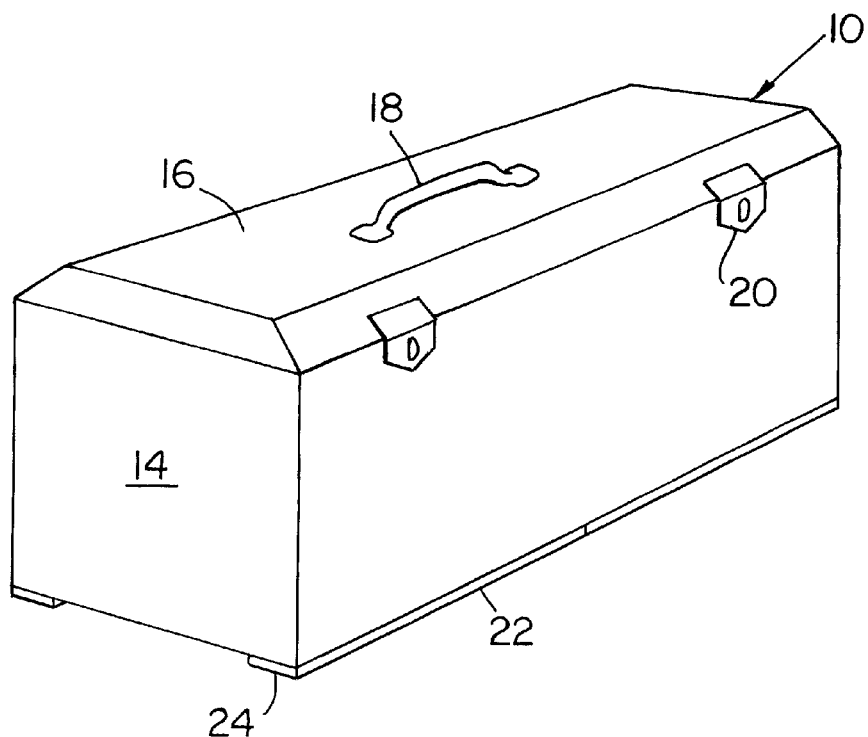
FIG. 1 is a perspective view of a first embodiment of a compact retroreflective sign system in a closed position.

A portable and compact retroreflective sign system 10 includes a retroreflective sign, which when in its rolled position, is housed in a box 14 with a hinged cover 16, as shown in FIG. 1. In one embodiment, the box has a height of about 30 cm, a width of about 30 cm, and the length of about 90 cm. The cover 16 can include a handle 18 to allow easy carrying of the box and latches 20 for securing the cover closed. In addition, the box 14 has legs 22 which can swivel about points 24 outwardly to provide greater stability and support of the opened sign to prevent it from tipping over in windy conditions.

Figure 2:
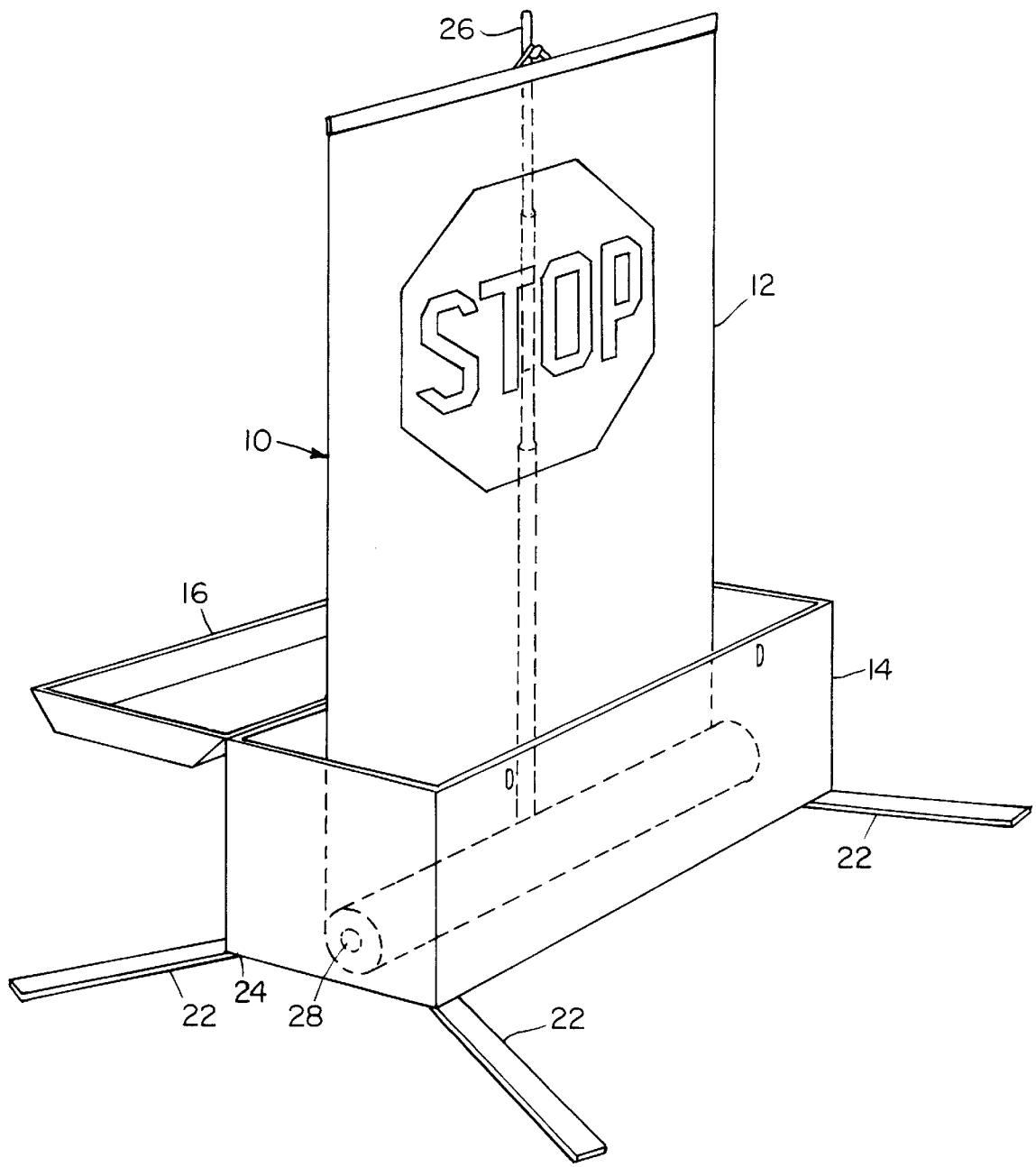
FIG. 2 is a perspective view of the first embodiment in an open position.

Shown in FIG. 2, box 14 is in an opened position. The rolled retroreflective sign is pulled straight up together or separately with a collapsible sign support 26. In one embodiment, the collapsible sign support 26 can be a telescoping pole and can have a height of about 175 cm.

The winding mechanism roller 28, such as in a window shade or self-winding projector screen, allows easy setup of the sign as well as easy roll-up of the sign after use. Alternatively, the roller may be manually wound. Further, the box 14 provides good protection of the sign once rolled up. The portable and compact system provides portability, while minimizing the manual and complicated steps of setting up and rolling up a traditional flexible roll-up sign which is supported with a cross-rib system.

Figure 3:
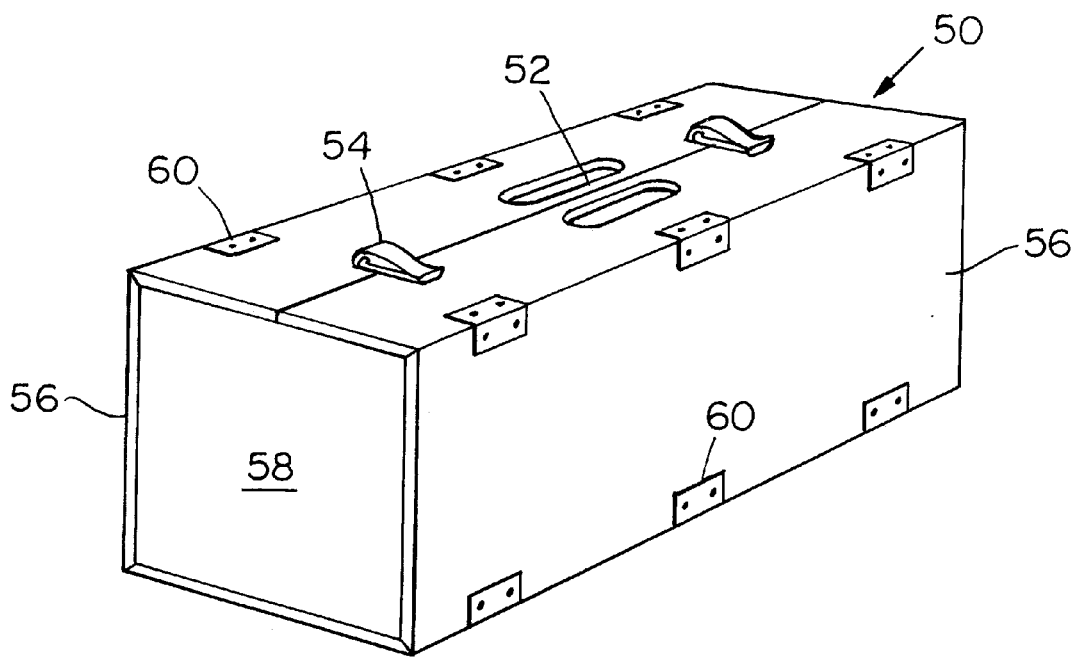
FIG. 3 is a perspective view of a second embodiment of the compact retroreflective sign system in a closed position.
Figure 4:
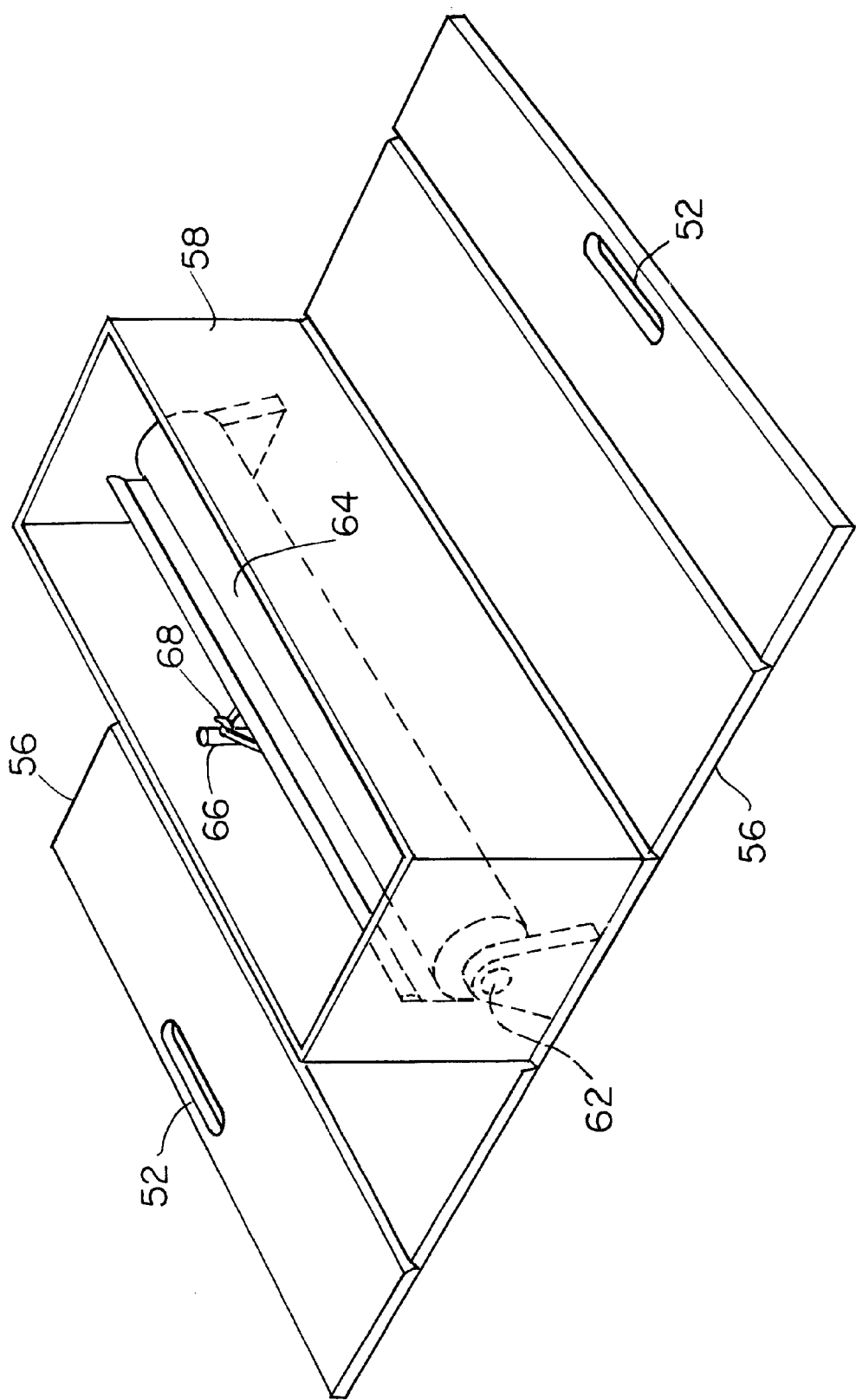
FIG. 4 is a perspective view of the second embodiment of the compact retroreflective sign system in a partially opened position.

In another embodiment, as shown in FIG. 3, system 50 can include handle 52 and latches 54 for securing the system closed. System 50 includes a series of base panels 56 which surround inner box body 58. Base panels 56 have hinges 60 to allow the panels to unfold. As shown in FIG. 4, the base panels 56 of the system 50 can be fully opened and laid flat on the ground. A winding mechanism roller 62 includes retroreflective sheeting 64, which includes cube-corner prisms 65, wound around roller 62. The winding mechanism roller 62 is attached to the interior of inner box body 58. A collapsible support 66 which is attachable by attachment means 68, such as a hook or latch, to one end of the retroreflective sheeting 64 is sufficiently extendable.

Figure 5:
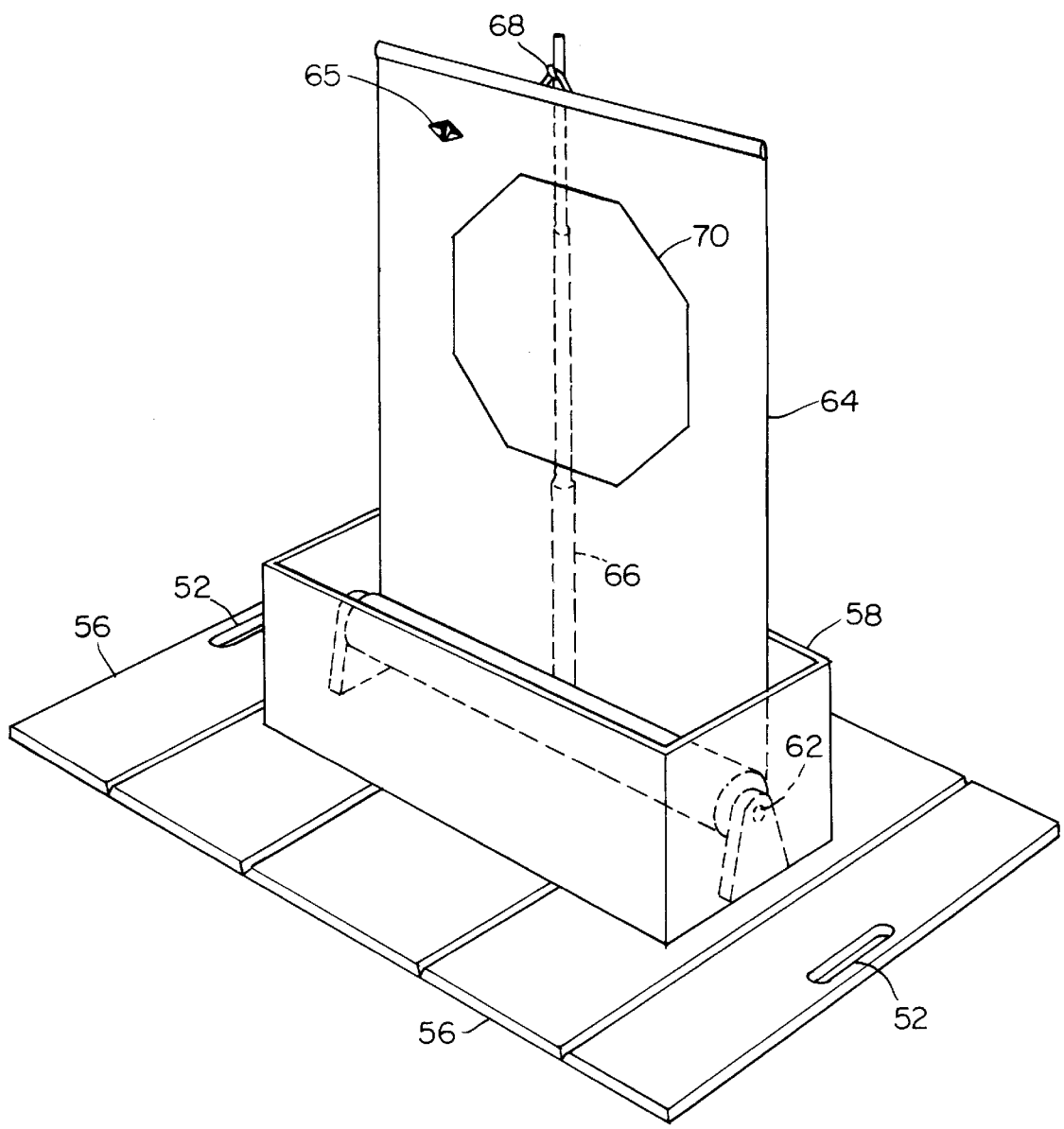
FIG. 5 is a perspective view of the second embodiment of the compact retroreflective sign system in an open position.

As shown in FIG. 5, retroreflective sheeting 12 is in an unwound position and the collapsible support 66 is in an extended position. The inner box body 58, which is pivotly mounted to the panels 56 by an attached pivot means, such as a carousel (not shown), and can then be rotated about ninety degrees to set on the flatten base panels. In this embodiment, the base panels serve as a base to support the opened retroreflective sheeting to help prevent it from tipping over in windy conditions. As shown, the inner box body 58 is rotated at an angle, preferably perpendicularly, to the folds of base panels to help provide stability to the system.

The retroreflective sheeting can include a traffic sign 70, such as a MEN WORKING, YIELD or STOP sign. After use, the sign is retracted by winding together with the collapsible support 66 into inner box body 58 and the base panels 56 of the system can then be folded and closed.

An example of a material suitable as a roll-up sign is disclosed in International Publication No. 97/37252, published on Oct. 7, 1997 and corresponding U.S. patent application Ser. No. 08/625,199, filed on Apr. 1, 1996, the teachings of which are incorporated herein in its entirety by reference. The system can be used at various sites where a temporary sign is needed such as with road work.

Retroreflective materials are typically formed of a sheet of thermoplastic, which has a colorant mixed therein with the polymers. Attached to the sheet of thermoplastic is an array of cube-corner or prismatic retroreflectors as described in U.S. Pat. No. 3,712,706, issued to Stamm on Jan. 23, 1973, the teachings of which are incorporated herein in its entirety by reference. Generally, the prisms are made by forming a master die on a flat surface of a metal plate or other suitable material. To form the cube-corner, three series of parallel equidistant intersecting V-shaped grooves 60 degrees apart are inscribed in the plate. The die is then used to process the desired cube-corner array into a flat plastic surface. When the groove angle is 70 degrees, 31 minutes, 43.6 seconds, the angle formed by the intersection of two cube faces (dihedral angle) is 90 degrees and the incident light is retroreflected back to the source.

The efficiency of a retroreflective structure is the measure of the amount of incident light returned within a cone diverging from the axis of retroreflection. A distortion of the prismatic structure adversely affects the efficiency. Furthermore, cube-corner retroreflective elements have low angularity at some orientation angles, for instance, the elements will only brightly reflect light that impinges on it within a narrow angular range centering approximately on its optical axis. Low angularity arises from the inherent nature of these elements which are trihedral structures having three mutually perpendicular lateral faces. The elements are arranged so that the light to be retroreflected impinges into the internal space defined by the faces, and the retroreflection of the impinging light occurs by internal retroreflection of the light from face to face of the element. Impinging light that is inclined substantially away from the optical axis of the element (which is a trisection of the internal space defined by the faces of the element) strikes the face at an angle less than its critical angle, thereby passing through the face rather than being reflected. Further details concerning the structures and the operation of cube-corner microprisms can be found in U.S. Pat. No. 3,684,348, issued to Rowland on Aug. 15, 1972, the teachings of which are incorporated by reference herein in its entirety. A method for making retroreflective sheeting is also disclosed in U.S. Pat. No. 3,689,346, issued to Rowland on Sep. 5, 1972, the teachings of which are incorporated by reference herein in its entirety. The disclosed method is for forming cube-corner microprisms in a cooperatively configured mold. The prisms are bonded to sheeting which is applied thereover to provide a composite structure in which cube-corner microprisms project from one surface of the sheeting.

Equivalents

Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A portable and compact retroreflective sign system comprising:

a) a base;

b) a winding mechanism roller attached to said base;

c) a retroreflective roll-up sheeting having a first end and a second end, wherein said first end is attached to said roller and said sheeting is wound about said roller;

d) a sign support attached to said base for supporting said sheeting in an unrolled position, wherein said sign support is extendible from said base;

e) an attachment means at the second end of said retroreflective roll-up sheeting for attaching said sheeting to said sign support; and f) a foldable cover on which said base is pivotally mounted, said foldable cover encloses the base, winding mechanism roller, said sheeting and sign support.

2. The sign system of claim 1 wherein said base includes a box for holding said winding mechanism roller, the retroreflective sign and said sign support in a retracted position.

3. The sign system of claim 2 wherein said base includes a plurality of legs mounted on said base.

4. The sign system of claim 2 wherein said box includes a cover and handle.

5. The sign system of claim 1 wherein said sign system further includes a traffic sign on the retroreflective roll-up sheeting.

6. The sign system of claim 1 wherein said retroreflective roll-up sheeting includes cube-corner prisms.

7. The sign system of claim 1 wherein said sign support includes a telescoping pole.

8. The sign system of claim 1 wherein said winding mechanism roller is a self-winding mechanism roller.

9. A portable and compact sign system comprising:

a) a base;

b) a winding mechanism roller attached to said base;

c) a roll-up sheeting having a first end and a second end, wherein said first end is attached to said roller and said sheeting is wound about said roller;

d) a sign support attached to said base for supporting said sheeting in an unrolled position, wherein said sign support is extendible from said base;

e) an attachment means at the second end of said roll-up sheeting for attaching said sheeting to said sign support; and f) a foldable cover on which said base is pivotally mounted, said foldable cover encloses the base, winding mechanism roller, roll-up sheeting and sign support.

10. The sign system of claim 9 wherein said box includes a cover and handle.

11. The sign system of claim 9 wherein said sign system further includes a traffic sign on the roll-up sheeting.

12. The sign system of claim 9 wherein said roll-up sheeting includes retroreflective sheeting.

13. The sign system of claim 9 wherein said sign support includes a telescoping pole.

14. The sign system of claim 9 wherein said winding mechanism roller is a self-winding mechanism roller.

* * * * *